(12) United States Patent
Kang

(10) Patent No.: US 12,013,003 B2
(45) Date of Patent: Jun. 18, 2024

(54) DISC BRAKE BOOT AND DISC BRAKE INCLUDING THE SAME

(71) Applicant: HL MANDO CORPORATION, Pyeongtaek-si (KR)

(72) Inventor: Myeongjin Kang, Yongin-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 225 days.

(21) Appl. No.: 17/406,497

(22) Filed: Aug. 19, 2021

(65) Prior Publication Data

US 2022/0056968 A1 Feb. 24, 2022

(30) Foreign Application Priority Data

Aug. 19, 2020 (KR) .......................... 10-2020-0104114

(51) Int. Cl.

| F16D 65/00 | (2006.01) |
|---|---|
| F16D 55/2265 | (2006.01) |
| F16D 65/092 | (2006.01) |
| F16D 55/00 | (2006.01) |
| F16D 65/02 | (2006.01) |
| F16D 65/18 | (2006.01) |
| F16D 121/04 | (2012.01) |

(52) U.S. Cl.
CPC ..... *F16D 65/0081* (2013.01); *F16D 55/2265* (2013.01); *F16D 65/0087* (2013.01); *F16D 2055/0037* (2013.01); *F16D 65/02* (2013.01); *F16D 65/092* (2013.01); *F16D 65/18* (2013.01); *F16D 2121/04* (2013.01)

(58) Field of Classification Search
CPC .. F16D 65/0081; F16D 65/0087; F16D 65/18; F16D 55/18; F16D 2055/0037; F16D 2121/04; F16D 65/02; F16J 15/106; F16J 15/3284
USPC ............ 188/73.44, 73.45; 277/644, 648, 649
See application file for complete search history.

(56) References Cited

U.S. PATENT DOCUMENTS

| 1,777,443 | A | * | 10/1930 | Mastin | .................... | F16J 15/106 |
| | | | | | | 277/648 |
| 3,334,774 | A | * | 8/1967 | Poltorak | ................. | F16J 15/106 |
| | | | | | | 277/648 |
| 4,447,066 | A | * | 5/1984 | Katagiri | ................... | F16J 15/52 |
| | | | | | | 74/18.1 |
| 4,678,064 | A | * | 7/1987 | Adachi | ................. | F16D 55/227 |
| | | | | | | 277/648 |

(Continued)

FOREIGN PATENT DOCUMENTS

| JP | H04101827 U | * | 9/1992 | ............. | F16D 65/02 |
| JP | 2012107740 A | * | 6/2012 | ......... | F16D 55/2265 |
| KR | 10-0694015 B1 | | 3/2007 | | |

*Primary Examiner* — Thomas J Williams
(74) *Attorney, Agent, or Firm* — Harvest IP Law, LLP

(57) ABSTRACT

A disc brake boot and a disc brake including the same are provided. The disc brake boot includes: a main body formed with a hollow that runs lengthwise through which a guide rod passes and is coupled; a first outer projection that is formed on an outer side of the main body in such a way as to protrude a set distance from one edge of the main body, along the perimeter of the main body; and a second outer projection that is formed on the outer side of the main body in such a way as to protrude a set distance along the perimeter of the main body, spaced apart from the first outer projection.

9 Claims, 5 Drawing Sheets

(56) References Cited

U.S. PATENT DOCUMENTS

| | | | | |
|---|---|---|---|---|
| 5,024,454 | A * | 6/1991 | McGilp | F16L 21/035 |
| | | | | 277/616 |
| 6,871,962 | B2 * | 3/2005 | Kane | G03B 21/145 |
| | | | | 353/100 |
| 2012/0234635 | A1 * | 9/2012 | Wake | F16D 55/2265 |
| | | | | 188/73.45 |
| 2013/0161134 | A1 * | 6/2013 | Kobayashi | F16D 55/2265 |
| | | | | 188/73.44 |
| 2022/0056968 | A1 * | 2/2022 | Kang | F16D 55/2265 |

* cited by examiner

| CASE | | Clamping force [N] | Contact pressure at bottom [MPa] | |
|---|---|---|---|---|
| | | | Min | Max |
| Guide rod | Case 0 | 788N | 1.7 | 2.4 |
| | Case 1 | 235N | 2.3 | 2.8 |

(a)

(b)

DISC BRAKE BOOT AND DISC BRAKE INCLUDING THE SAME

CROSS-REFERENCE TO RELATED APPLICATIONS

This application claims benefit and priority to Korean Patent Application No. 10-2020-0104114, filed on Aug. 19, 2020, with the Korean Intellectual Property Office, the disclosure of which is incorporated herein in its entirety by reference.

BACKGROUND OF THE DISCLOSURE

Field of the Disclosure

The present disclosure relates to a disk brake boot and a disc brake including the same, more particularly, to a disk brake boot which is employed to protect a guide rod of a disc brake and a disc brake including the same.

Related Art

A brake on a vehicle is a device that is used to slow down or stop the vehicle while driving or to maintain it in a stopped position.

Brakes slow or stop the vehicle by converting kinetic energy into heat energy during driving by a mechanical friction device, and include drum-type hydraulic brakes and disc-type hydraulic brakes.

A disc brake is a type of brake that acquires braking force by squeezing pads against both sides of a disc, in place of a drum, that rotates together with a wheel.

A conventional technology for disc brakes was disclosed in Korean Registered Patent Publication NO. 10-0694015 (hereinafter, "conventional technology") filed by the applicant of the present disclosure.

A disc brake for a vehicle includes a caliper housing which houses a piston 200 that moves forward and backward by hydraulic braking pressure, a carrier fixed to a vehicle body, with a pair of pad plates fitted to it, and a disc that rotates with a wheel as the outer circumference is partially inserted between the pad plates.

A cylinder that transmits hydraulic braking pressure and a piston that moves forward and backward by the hydraulic braking pressure transmitted through the cylinder are provided at the back of the caliper housing. Also, a pair of pad plates with pads attached to them are fitted to the carrier in the direction of the disc, with a gap in between.

The pad plates include an inner pad plate with an inner pad attached to it and an outer pad plate with an outer pad attached to it. The inner pad receives pressure from the piston, and the outer pad receives pressure from the caliper housing.

Meanwhile, the caliper housing is coupled to the carrier through a guide rod in such a way as to slide in the same direction as the piston's direction of motion. In this case, the guide rod is formed with a boot. Referring to FIG. 1, the boot is coupled to the guide rod and the carrier at the same time, but does not disturb the reciprocating motion of the guide rod and prevents entry of foreign materials into where the guide rod and the boot are coupled.

However, the boot 10 used in the conventional art is lack in flexibility due to its large contact area with the carrier 1, and accordingly more clamping force is exerted on the guide rod 3 covered by the boot 10.

This increase in clamping force exerted by the boot 10 results in brake drag. Brake drag happens when the pads don't release completely when the braking force is removed. This leads to a safety problem and there is a growing need for reducing such drag.

SUMMARY

The present disclosure provides a disk brake boot which is employed to reduce drag by protecting a guide rod of a disc brake and decreasing clamping force on the guide rod, and a disc brake including the same.

An exemplary embodiment of the present disclosure provides a disc brake boot including: a main body formed with a hollow that runs lengthwise through which a guide rod passes and is coupled; a first outer projection that is formed on an outer side of the main body in such a way as to protrude a set distance from one edge of the main body, along the perimeter of the main body, and that makes surface contact with an inner surface of a boot coupling recess formed in a carrier when inserted into the boot coupling recess; and a second outer projection that is formed on the outer side of the main body in such a way as to protrude a set distance along the perimeter of the main body, spaced apart from the first outer projection, and that is pressed against the inner surface of the boot coupling recess when inserted into the boot coupling recess.

Furthermore, the disc brake boot may further include an inner projection that is formed on an inner side of the main body in such a way as to protrude along the perimeter of the main body, and that is pressed by the guide rod when the guide rod passes through the hollow.

Furthermore, a plurality of first protrusions may be formed on an outer side of the first outer projection so that one or more first grooves are formed.

Furthermore, a plurality of second protrusions may be formed on an outer side of the second outer projection so that one or more second grooves are formed.

Furthermore, the disc brake boot may further include: a third outer projection that is formed on the outer side of the main body in such a way as to protrude along the perimeter of the main body, spaced apart from the second outer projection, and that is pressed against an inner surface of a rod insertion recess formed in the carrier; and a rib that is formed on the outer side of the main body in such a way as to protrude along the perimeter of the main body, from where the rib is spaced apart from the third outer projection to the other edge of the main body, and that is positioned outside the carrier.

Furthermore, one or more inner projections may be formed along the length of the main body.

Furthermore, a plurality of third protrusions may be formed on a bottom side of the inner projection so that one or more third grooves are formed.

Another exemplary embodiment of the present disclosure provides a disc brake including: a carrier with a pair of pad plates that are attached tightly to both sides of a disc; a housing with a cylinder housing a piston that moves forward and backward by hydraulic pressure, and that is slidably coupled to the carrier; a guide rod, one end of which is coupled to the housing, and the other end of which is inserted into the carrier to make the housing slide; and a boot through which the guide rod passes and is coupled so as to cover the guide rod, one portion of which is inserted into the carrier, along with the guide rod, and the rest is protruded out of the carrier.

Furthermore, the carrier may be formed with a rod insertion recess to insert the guide rod therein, and a boot coupling recess for coupling with the boot may be formed on an inner side of the rod insertion recess in a direction that intersects the rod insertion recess.

The boot may include: a main body formed with a hollow that runs lengthwise through which a guide rod passes and is coupled; a first outer projection that is formed on an outer side of the main body in such a way as to protrude a set distance from one edge of the main body, along the perimeter of the main body, and that makes surface contact with an inner surface of the boot coupling recess; a second outer projection that is formed on the outer side of the main body in such a way as to protrude a set distance along the perimeter of the main body, spaced apart from the first outer projection, and that is pressed against the inner surface of the boot coupling recess; and an inner projection that is formed on an inner side of the main body in such a way as to protrude along the perimeter of the main body, and that is pressed by the guide rod when the guide rod passes through the hollow.

The boot may further include: a third outer projection that is formed on the outer side of the main body in such a way as to protrude along the perimeter of the main body, spaced apart from the second outer projection, and that is pressed against an inner surface of the rod insertion recess; and a rib that is formed on the outer side of the main body in such a way as to protrude along the perimeter of the main body, from where the rib is spaced apart from the third outer projection to the other edge of the main body, and that is positioned outside the carrier.

A plurality of first protrusions may be formed on the first outer projection so that one or more first grooves are formed, and a plurality of second protrusions may be formed on the second outer projection so that one or more second grooves are formed.

Specific details of other embodiments are included in the detailed description and drawings.

DESCRIPTION OF EXEMPLARY EMBODIMENTS

Figure 1:
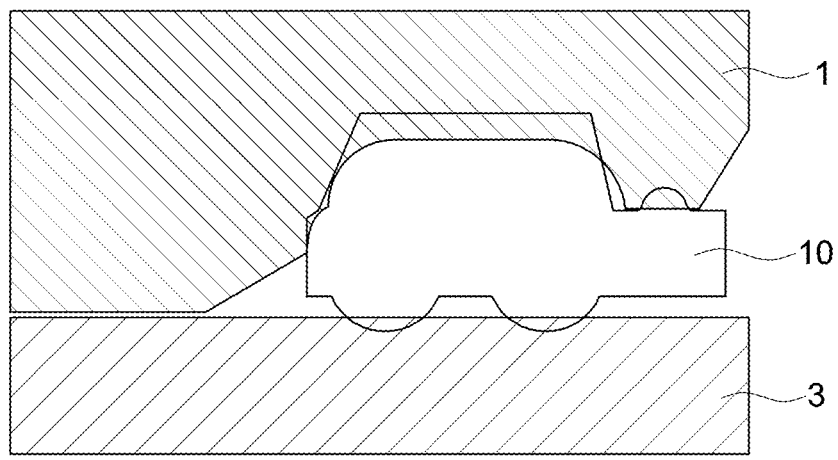
FIG. 1 illustrates a cross-section of part of a disc brake structure employing a boot according to the conventional art.

Hereinafter, exemplary embodiments of the present disclosure will be described in detail with reference to the accompanying drawings so that those skilled in the technical field to which the present disclosure pertains may easily carry out the exemplary embodiment. The present disclosure may be implemented in various different ways and is not limited to the exemplary embodiments described herein.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Exemplary embodiments of the present disclosure illustrate ideal exemplary embodiments of the present disclosure in detail. As a result, various modifications of the drawings are expected. Therefore, the exemplary embodiments are not limited to specific forms in regions illustrated in the drawings, and for example, include modifications of forms by the manufacture thereof.

Hereinafter, a disc brake and a boot applied to the same according to an embodiment of the present disclosure will be described in detail with reference to FIGS. 2 and 3.

First of all, a disc brake according to the present disclosure includes a carrier 1, a housing (not shown), a guide rod 3, and a boot 100.

The carrier 1 has a pair of pad plates (not shown) that are attached tightly to both sides of a disc (not shown) in order to slow down or stop the rotation of the disc (not shown).

The housing (not shown) is slidably coupled to the carrier 1, which houses a piston (not shown) inside that moves forward and backward by hydraulic pressure.

When a hydraulic pressure (hydraulic braking pressure) is applied to the housing (not shown), the piston moves forward by the hydraulic pressure and pushes one (not shown) of the pair of pad plates (not shown) toward the disc (not shown). In this instance, a pulling force is generated from the housing (not shown), as opposed to the pushing force of the piston (not shown), thus pushing the other pad plate (not shown) toward the disc (not shown).

Once the hydraulic pressure applied to the housing (not shown) is removed, the piston (not shown) moves backward and the pair of pad plates (not shown) pressing the disc (not shown) move away from the disc (not shown).

As described above, the housing (not shown) is slidably coupled to the carrier 1, which is caused by the guide rod 3.

One end of the guide rod 3 is coupled to the housing (not shown), and the other end is inserted into the carrier 1. Accordingly, the carrier 1 is formed with a rod insertion recess 1a to insert the guide rod 3 therein.

Also, a boot is provided which covers the guide rod 3 when the guide rod 3 is inserted into the carrier 1. The boot 100, along with the guide rod 3, is coupled to the carrier 1.

To this end, the carrier 1 is formed with a boot coupling recess 1b for coupling with the boot 3, as well as the rod insertion recess 1a. The boot coupling recess 1b is formed to a predetermined depth in a direction that intersects the rod insertion recess 1a, on an inner side of the rod insertion recess 1a positioned at a set distance from one edge of the carrier 1 where the rod insertion recess 1a is formed.

Accordingly, with the boot 100 covering an outer side of the guide rod 3, the guide rod 3 is coupled to the boot coupling recess 1b when the guide rod 3 is inserted into the rod insertion recess 1a.

Figure 2:
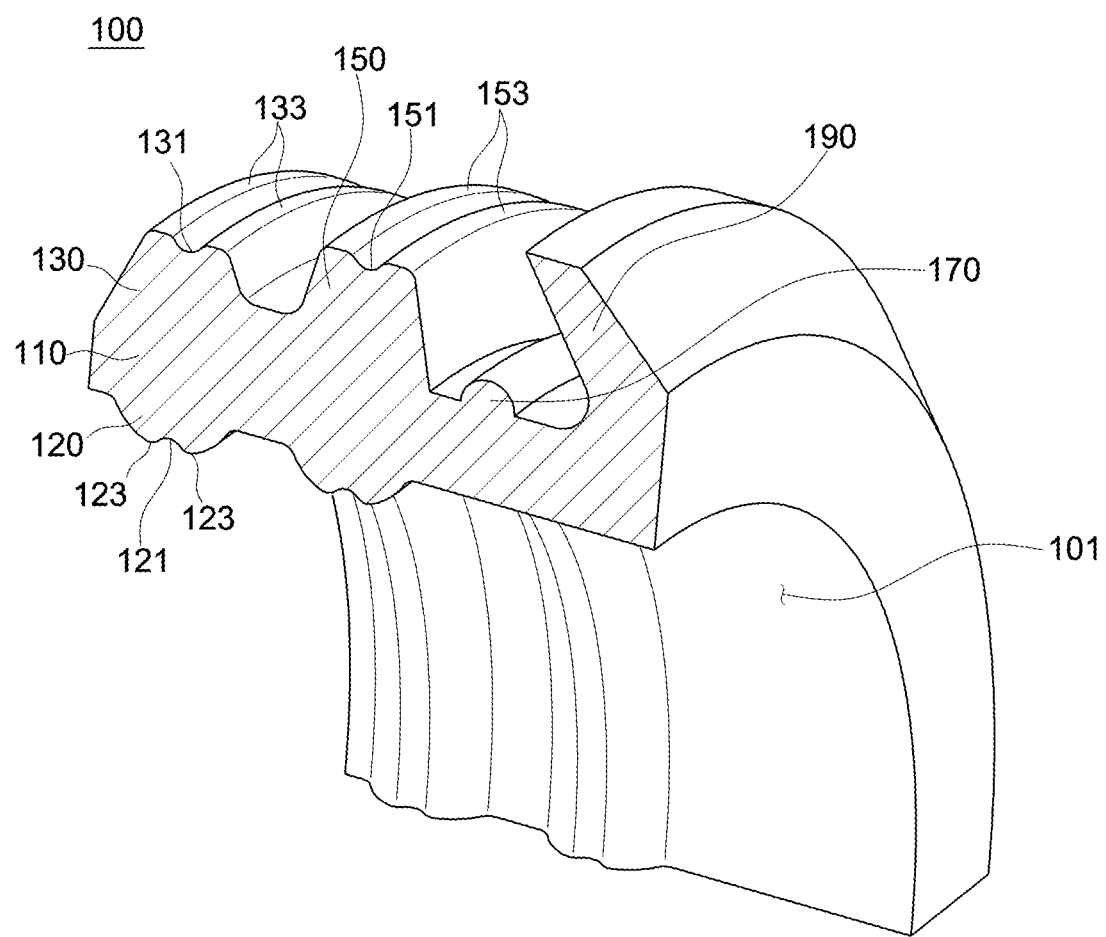
FIG. 2 is illustrates a cross-section of part of a disc brake structure employing a disc brake boot according to one embodiment of the present disclosure.

Meanwhile, the boot 100 is not entirely coupled to the boot coupling recess 1b, and, as shown in FIG. 2, one portion thereof is coupled to the boot coupling recess 1b and inserted into the carrier 1 and the rest is protruded out of the carrier 1.

Such a structure of the boot 100 will be described below in more details with reference to FIG. 3.

The boot 100 according to one embodiment of the present disclosure includes a main body 110, a first outer projection 130, and a second outer projection 150.

A hollow 101 is formed through the center of the main body 110 and runs lengthwise, and the guide rod 3 passes through the hollow 101 and is coupled to the boot 100. Although the overall shape of the main body 110 is not entirely depicted, the main body 110 is formed in a cylindrical shape. However, this shape only applies to this embodiment, and the main body 110 may have other various shapes as necessary.

The first outer projection 130 is formed on an outer side of the main body 110. More specifically, the first outer projection 130 protrudes a set distance from one edge of the main body 110, along the perimeter of the main body 110.

Figure 3:
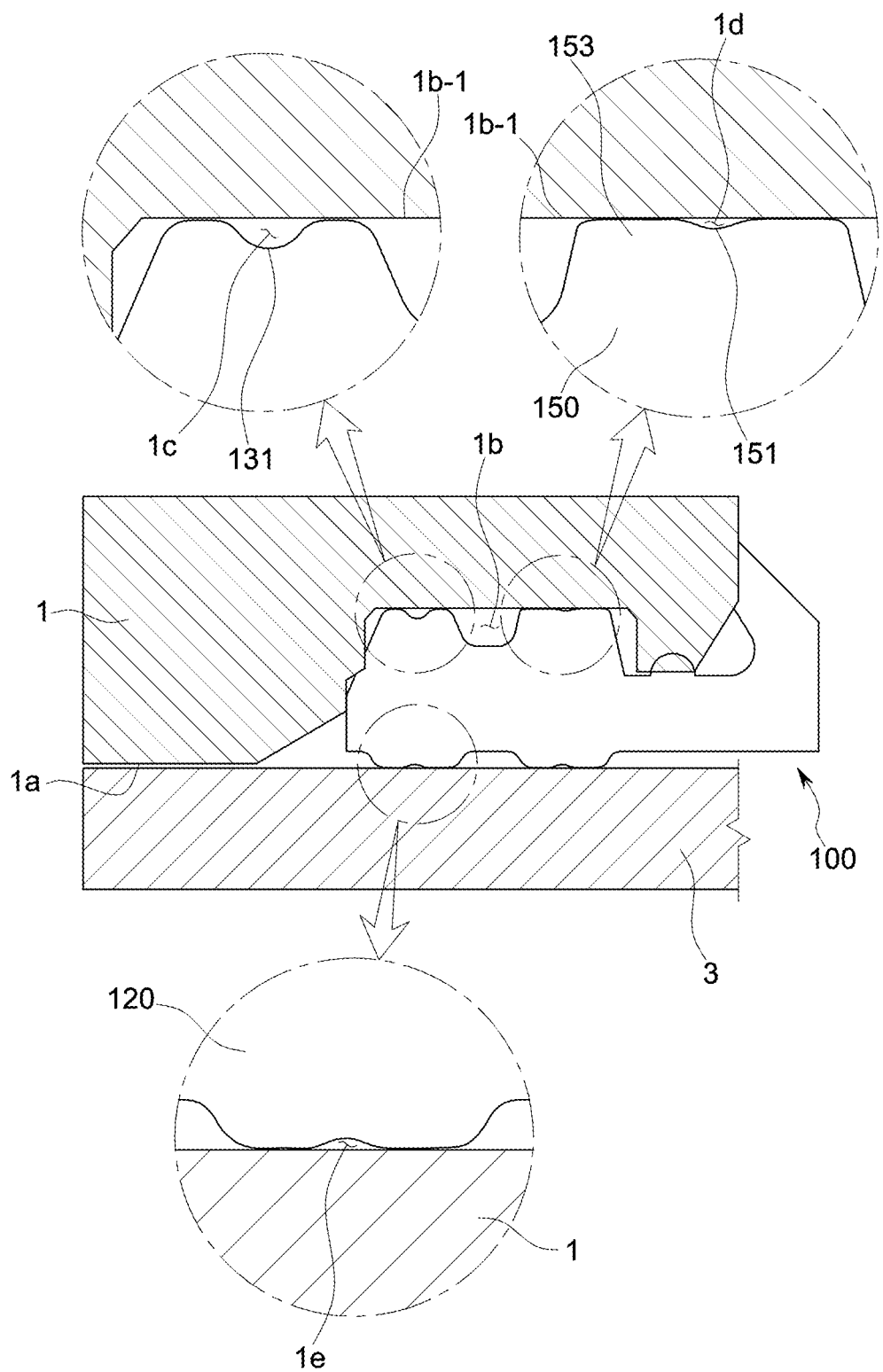
FIG. 3 illustrates a partial perspective view of a disc brake boot according to one embodiment of the present disclosure.

Referring to FIG. 3, the first outer projection 130 is sloped more steeply as its portion extending from one edge of the main body 110 is extended further upward from the outer side of the main body 110.

One side of the main body 110 is a portion that enters first when the boot 100 is inserted into the carrier 1, which is sloped as described above and therefore expected to make the insertion of the boot 100 smooth. However, the shape of the first outer projection 130 is not limited to this.

A plurality of first protrusions 133 are formed on an outer side of the first outer projection 130 so that one or more first grooves 131 are formed. In this embodiment, as shown in FIG. 3, two first protrusions 133 are formed on an outer side of the first outer projection 130, and one first groove 131 is formed between the two first protrusions 133.

Referring to FIG. 2, an outer side of the first outer projection 130 makes surface contact with an inner surface 1b-1 of the boot coupling recess 1b when the boot 100 is inserted and coupled to the boot coupling recess 1b. That is, the first protrusions 133 make surface contact with the inner surface 1b-1 of the boot coupling recess 1b.

When the guide rod 3 is inserted into the rod insertion recess 1a, grease is injected. By injecting the grease, the guide rod 3 may be smoothly inserted without friction with the rod insertion groove 1a, and the guide rod 3 may slide smoothly within the rod insertion groove 1a.

As described above, once the outer side of the first outer projection 130 and the inner surface 1b-1 of the booth coupling recess 1b make surface contact with each other, a first space 1c is formed between the first groove 131 and the inner surface 1b-1 of the boot coupling recess 1b.

The grease may be stored in the first space 1c, and the grease stored in the first space 1c may leak out a little whenever the guide rod 3 slides, thus lubricating the space between the boot 100 and the boot coupling recess 1b and preventing the boot 100 from being damaged by friction.

Moreover, the grease stored in the first space 1c helps prevent foreign materials from the outside from getting further inside, because they are collected in the grease stored in the first space 1c.

As it is for the first outer projection 130, the second outer projection 150 is formed on an outer side of the main body 110. The second outer projection 150 is formed on the outer side of the main body 110 in such a way as to protrude a set distance along the perimeter of the main body 110, from where it is positioned at a predetermined distance from the first outer projection 130.

When viewed in a cross-section of the boot 100 with reference to FIG. 3, the height of the second outer projection 150 is greater than the height of the first outer projection 130. Accordingly, when the boot 100 is coupled to the boot coupling recess 1b, an outer side of the second outer projection 150 is pressed against the inner surface 1b-1 of the boot coupling recess 1b.

Meanwhile, a plurality of second protrusions 153 are formed on the second outer projection 150, as it is for the first outer projection 130, so that one or more second grooves 151 are formed on the outer side of the second outer projection 150. In this embodiment, as illustrated in FIG. 3, the two second protrusions 153 are formed, and the second groove 151 is formed between the second protrusions 153.

As described above, although the second outer projection 150 is pressed against the inner surface 1b-1 of the boot coupling recess 1b, but the second groove 151 and the second protrusions 153 are not made flat. Thus, a fine second space 1d may be formed between the second groove 151 and the inner surface 1b-1 of the boot coupling recess 1b.

As it is for the first space 1c, the grease may be stored in the second space 1d, and the grease stored in the second space 1d may leak out whenever the guide rod 3 slides.

As it is for the first space 1c, the grease stored in the second space 1d helps prevent foreign materials from the outside from getting further inside, because they are collected in the grease stored in the second space 1d.

Meanwhile, the boot 100 further includes an inner projection 120 formed on an inner side of the main body 110 with the hollow 101 formed therein.

One or more inner projections 120 may be formed on the inner side of the main body 110. In this embodiment, two inner projections 120 are formed as illustrated in FIG. 3.

The inner projections 120 is formed on the inner side of the main body 110 in such a way as to protrude a set distance along the perimeter of the main body 110, from where it is positioned at a predetermined distance from one edge of the main body 110. Also, the two inner projections 120 are formed along the length of the main body 110, spaced apart from each other by a set distance.

As it is for the first outer projection 130 and the second outer projection 150, the inner projections 120 each have one or more third grooves 121 and one or more third protrusions 123. Two third protrusions 123 are formed on the tip of the inner projection 120, spaced apart from each other, and the third groove 121 is formed between the third protrusions 123 neighboring each other.

When the guide rod 3 passes through the hollow 101 and is coupled to the boot 100, the inner projection 120 is pressed by the guide rod 3. However, the pressure applied by the guide rod 3 to the inner projection 120 is not high enough. Thus, a third space 1e is formed between the third groove 121 and the outer side of the guide rod 3.

A small amount of the above-mentioned grease is stored in the third space 1e, and, when the guide rod 3 slides, the grease stored in the third space 1e leaks out, thereby allowing the guide rod 3 to slide smoothly and preventing friction between the boot 100 and the guide rod and a resulting damage to the boot 100.

The boot 100 may further include a third outer projection 170 and a rib 190.

The third outer projection 170 may be formed on the outer side of the main body 110 in such a way as to protrude a set distance from the second outer projection 150, along the perimeter of the main body 110.

When a portion of the boot 100 is coupled to the boot coupling recess 1b, the third outer projection 170 makes contact with the inner side of the rod insertion recess 1a between the boot coupling recess 1b and one edge of the carrier 1 and is pressed against the inner side of the rod insertion recess 1a.

As the second outer projection 150 and the third outer projection 170 are pressed against the carrier 1, it is possible to prevent foreign materials from the outside from entering between the carrier 1 and the boot 100.

Meanwhile, although a repulsive force of the boot 100 may be generated because the second outer projection 150 and the third outer projection 170 are pressed against the carrier 1, this embodiment allows for reducing the repulsive force of the boot 100 by the grease stored in the first space 1c and the second space 1d as described above. With the reduction in the repulsive force of the boot 100, drag may be reduced.

The rib 190 is formed on the outer side of the main body 110 in such a way as to protrude along the perimeter of the main body 110, from where it is positioned at a set distance from the third outer projection 170 to the other edge of the main body 110.

Referring to FIG. 2, a side of the rib 190 that faces the other edge of the main body 110 makes surface contact with one edge of the carrier 1. With this structure, the rib 190 prevents foreign materials from the outside from entering between the carrier 1 and the boot 100.

The disc brake according to the present disclosure is able to significantly decrease the contact area between the boot 100 and the carrier 1 by employing the above-described boot 100, and is also able to reduce drag since the boot 1 exerts less clamping force on the guide rod 3 due to the decrease in the contact area between the boot 100 and the carrier 1.

Particularly, the first space 1c, the second space 1d, and the third space 1e which are formed by the first groove 131, second groove 151, and third groove 121 formed on the boot 100 serve as a grease pocket, thus allowing the guide rod 3 to slide smoothly without being affected by the repulsive force of the boot 100.

Figure 4:
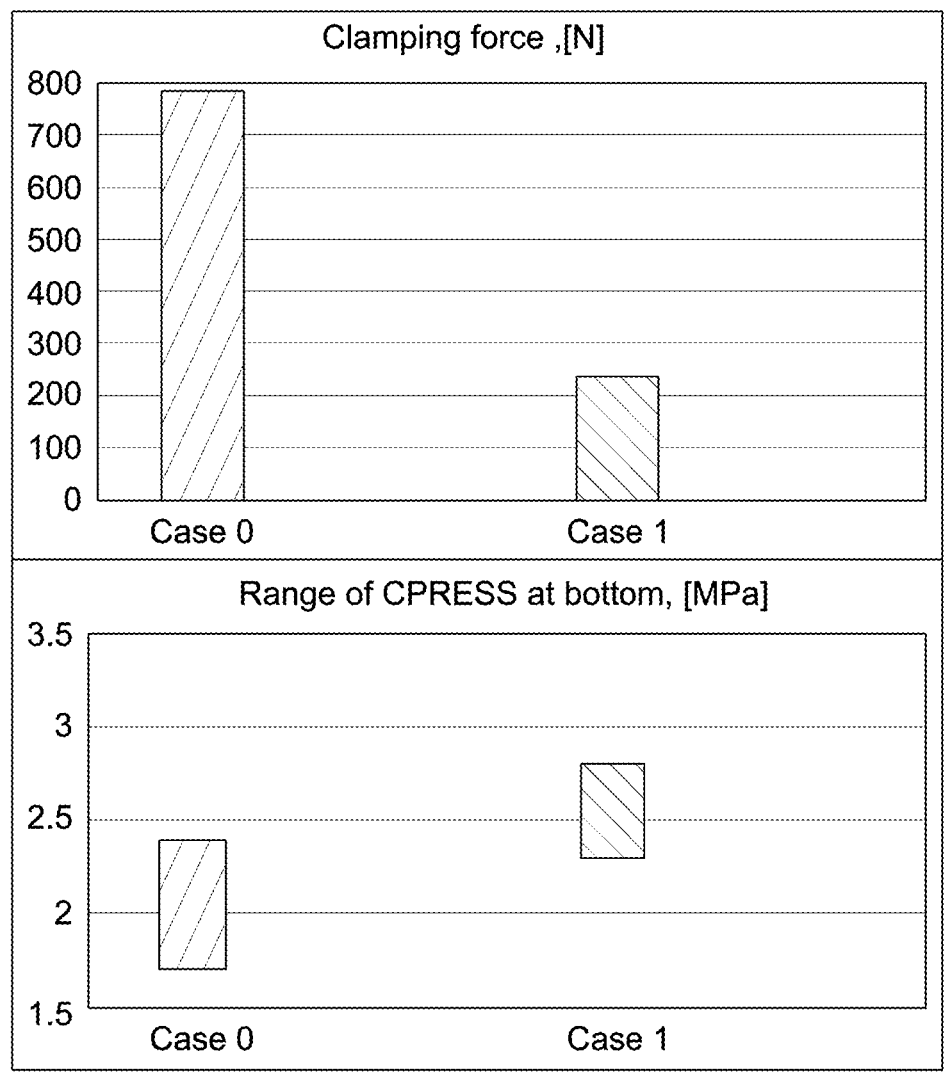
FIG. 4 illustrates test results for the analysis of clamping forces exerted by a conventional boot and a boot according to this embodiment.
Figure 5:
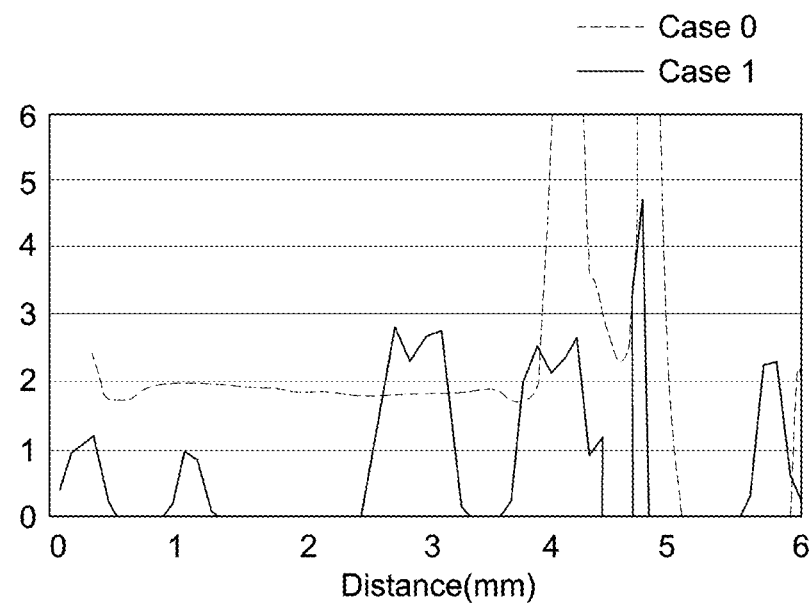
FIG. 5 illustrates a graph of test results for distributions of pressures applied to the conventional boot and the boot according to this embodiment.
Figure 5:
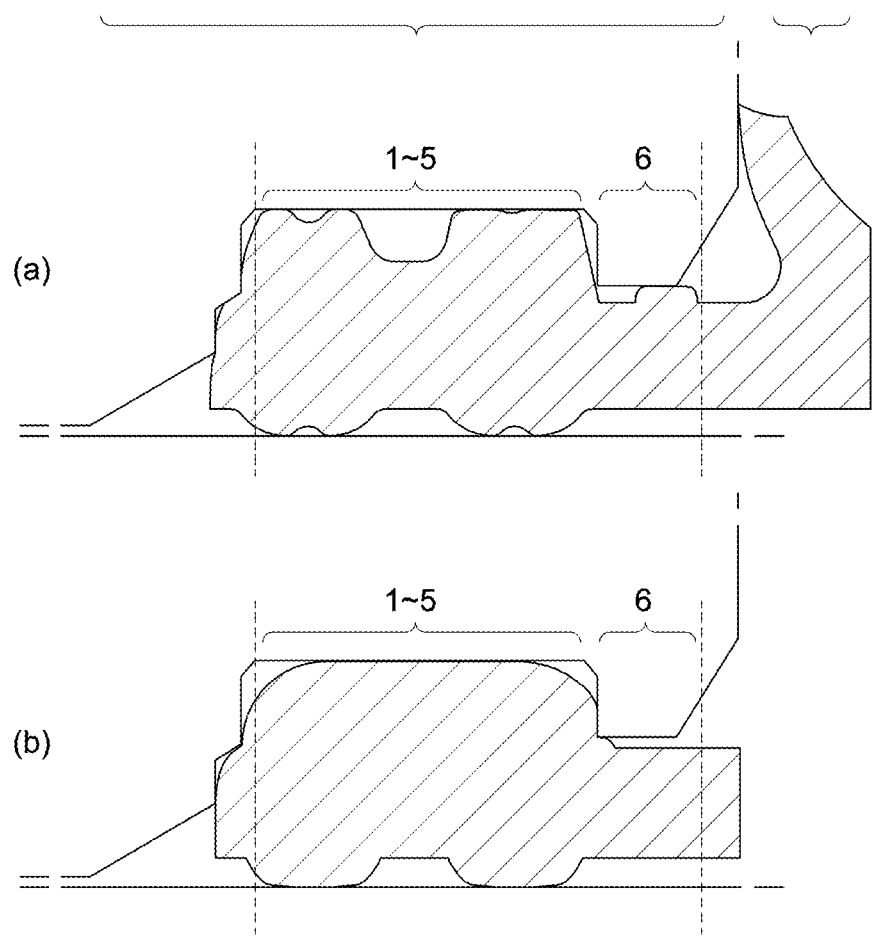

FIGS. 4 and 5 illustrate test results showing clamping forces exerted by the conventional boot shown in FIG. 1 and the boot according to one embodiment of the present disclosure and differences in contact pressure with the guide rod.

Referring to (a) and (b) of FIG. 4, it can be seen that the clamping force on the guide rod exerted by the boot (case 1) according to one embodiment of the present disclosure was significantly lower than the clamping force on the guide rod exerted by the conventional boot (case 0).

The clamping force on the guide rod exerted by the conventional boot (case 0) was 788N, which is a large decrease in comparison to the clamping force on the guide rod exerted by the boot (case 1) according to one embodiment of the present disclosure was 235N.

The above test results indicate that the volume of the boot 100 was reduced a lot compared to the conventional boot since the boot 100 according to one embodiment of the present disclosure had a difference shape, and accordingly the contact area between the boot 100 and the carrier 1 was decreased.

The conventional boot had a large contact area as shown in FIG. 2 in order to prevent entry of foreign materials from the outside. However, the boot 100 according to this embodiment, even with the decrease in contact area, allows the formation of the first groove 131 and second groove 151 on the first outer projection 130 and second outer projection 150, thereby maintaining a sealing function to prevent entry of foreign materials from the outside, as in the conventional art.

Meanwhile, it can be seen that the contact pressure between the boot (case 1) according to this embodiment and the guide rod is greater compared to the contact pressure between the conventional boot (case 0) and the guide rod. However, it can be construed that there is no meaningful difference in contact pressure with the guide rod between the conventional boot and the boot according to this embodiment, because the contact pressure between the conventional boot (case 0) and the guide rod was 1.7N and the contact pressure between the boot (case 1) according to this embodiment and the guide rod was 2.3N, which indicate that both contact pressures are within a similar range.

FIG. 5 is a graph illustrating distributions of contact pressures on the boot (a, case 1) according to the present disclosure and the conventional boot (b, case 0).

Referring to FIG. 5, it can be seen that the boot (a, case 1) according to the present disclosure receives a different pressure at each point of contact with the carrier 1, more specifically, the inner surface 1b-1 of the boot coupling recess 1b.

It can be seen that more pressure is applied to the second protrusions 153 of the second outer projection 150 pressed against the inner surface 1b-1 and the third outer projection 170 pressed against the inner side of the rod insertion recess 1a, as compared to the first protrusions 133 of the first outer projection 130 which simply make surface contact with the inner surface 1b-1.

On the contrary, in the case of the conventional boot (b, case 0), it can be seen that pressure is concentrated mainly at a portion corresponding to the second protrusions 153 of the second outer projection 150 of the boot 100 according to the present disclosure.

Moreover, it can be seen that the conventional boot (b, case 0) receives more pressure from the carrier overall compared to the boot 100 according to the present disclosure.

From these test results, the boot 100 according to the present disclosure receives less pressure compared to the conventional boot, thus significantly decreasing the clamping force on the guide rod, and, even if it receives less pressure than the conventional boot does, is able to prevent entry of foreign materials from the outside since the gap between the boot and the carrier and the gap between the boot and the guide rod are kept sealed by a plurality of outer projections and grooves formed on each of the outer projections.

Although exemplary embodiments of the present disclosure have been described above with reference to the accompanying drawings, it should be understood by those skilled in the art that the present disclosure may be embodied in other specific forms without changing the technical spirits and essential features of the present disclosure.

Therefore, it should be understood that the embodiments described above are only exemplary in all aspects and not limiting. It should be understood that the scope of the present disclosure is defined by the following claims and that all changes or modifications derived from the meaning and scope of the claims and their equivalents are included in the scope of the present disclosure.

A disc brake boot and a disc brake including the same according to the present disclosure have the following advantages.

Firstly, only the second outer projection is pressed against the carrier as the first outer projection and the second outer projection are formed on the main body of the boot, which may decrease the surface area pressed by the carrier and therefore decrease the clamping force on the guide rod. With this decrease in the clamping force on the guide rod, drag may be reduced.

Secondly, it is possible to prevent damage to the boot due to friction by forming grooves on the first outer projection and the second outer projection and utilizing the space between the inner surface of the boot coupling recess and the grooves as a space for storing grease.

REFERENCE NUMERALS

1: carrier
3: guide rod
100: boot
101: hollow
110: main body
120: inner projection
121: third groove
123: third protrusion
130: first outer projection
131: first groove
133: first protrusion
150: outer projection
151: second groove
153: second protrusion
170: third outer projection
190: rib

What is claimed is:

1. A disc brake boot comprising:
a main body formed with a hollow that runs lengthwise through which a guide rod passes and is coupled;
a first outer projection that is formed on an outer side of the main body in such a way as to protrude a set distance from one edge of the main body, along the perimeter of the main body, and that makes surface contact with an inner surface of a boot coupling recess formed in a carrier when inserted into the boot coupling recess;
a second outer projection that is formed on the outer side of the main body in such a way as to protrude a set distance along the perimeter of the main body, spaced apart from the first outer projection, and that is pressed against the inner surface of the boot coupling recess when inserted into the boot coupling recess; and
a third outer projection that is formed on the outer side of the main body in such a way as to protrude radially along the perimeter of the main body, spaced axially outward from the first outer projection and the second outer projection, and that is pressed against a support protrusion of a rod insertion recess formed in the carrier; and
a rib that is formed on the outer side of the main body in such a way as to protrude along the perimeter of the main body, from where the rib is spaced apart from the third outer projection to an outer edge of the main body, and that is positioned outside the carrier.

2. The disc brake boot of claim 1, further comprising an inner projection that is formed on an inner side of the main body in such a way as to protrude along the perimeter of the main body, and that is pressed by the guide rod when the guide rod passes through the hollow.

3. The disc brake boot of claim 1, wherein a plurality of first protrusions are formed on an outer side of the first outer projection so that one or more first grooves are formed.

4. The disc brake boot of claim 1, wherein a plurality of second protrusions are formed on an outer side of the second outer projection so that one or more second grooves are formed.

5. The disc brake boot of claim 2, wherein one or more inner projections are formed along the length of the main body.

6. The disc brake boot of claim 2, wherein a plurality of third protrusions are formed on a bottom side of the inner projection so that one or more third grooves are formed.

7. A disc brake comprising:
a carrier with a pair of pad plates that are attached tightly to both sides of a disc;
a housing with a cylinder housing a piston that moves forward and backward by hydraulic pressure, and that is slidably coupled to the carrier;
a guide rod, one end of which is coupled to the housing, and the other end of which is inserted into the carrier to make the housing slide; and
a boot through which the guide rod passes and is coupled so as to cover the guide rod, one portion of which is inserted into the carrier, along with the guide rod, and the rest is protruded out of the carrier,
wherein the carrier is formed with a rod insertion recess to insert the guide rod therein,
and a boot coupling recess for coupling with the boot is formed on an inner side of the rod insertion recess in a direction that intersects the rod insertion recess,
wherein a support protrusion is formed on an inner surface of the rod insertion recess, wherein the boot comprises:
a main body formed with a hollow that runs lengthwise through which the guide rod passes and is coupled;
a first outer projection that is formed on an outer side of the main body in such a way as to protrude a set distance from one edge of the main body, along the perimeter of the main body, and that makes surface contact with an inner surface of the boot coupling recess;
a second outer projection that is formed on the outer side of the main body in such a way as to protrude a set distance along the perimeter of the main body, spaced apart from the first outer projection, and that is pressed against the inner surface of the boot coupling recess; and
a third outer projection that is formed on the outer side of the main body in such a way as to protrude radially along the perimeter of the main body, spaced axially outward from the first outer projection and the second outer projection, and that is pressed against the support protrusion of the rod insertion recess; and
a rib that is formed on the outer side of the main body in such a way as to protrude along the perimeter of the main body, from where the rib is spaced apart from the third outer projection to an outer edge of the main body, and that is positioned outside the carrier.

8. The disc brake of claim 7, wherein the boot comprises:
an inner projection that is formed on an inner side of the main body in such a way as to protrude along the perimeter of the main body, and that is pressed by the guide rod when the guide rod passes through the hollow.

9. The disc brake of claim 7, wherein a plurality of first protrusions are formed on the first outer projection so that one or more first grooves are formed, and a plurality of second protrusions are formed on the second outer projection so that one or more second grooves are formed.

* * * * *